June 19, 1962 W. H. LOHNEISS ET AL 3,039,692

COMPUTER CIRCUIT

Filed March 21, 1960

INVENTOR.
WILLIAM H. LOHNEISS
BY RUBIN BOXER
Carl Hoppe
ATTORNEY

United States Patent Office 3,039,692

Patented June 19, 1962

3,039,692

COMPUTER CIRCUIT

William H. Lohneiss and Rubin Boxer, Santa Barbara, Calif., assignors to Servomechanisms, Inc., Hawthorne, Calif., a corporation of New York Filed Mar. 21, 1960, Ser. No. 16,592
3 Claims. (Cl. 235—183)

Figure 1:
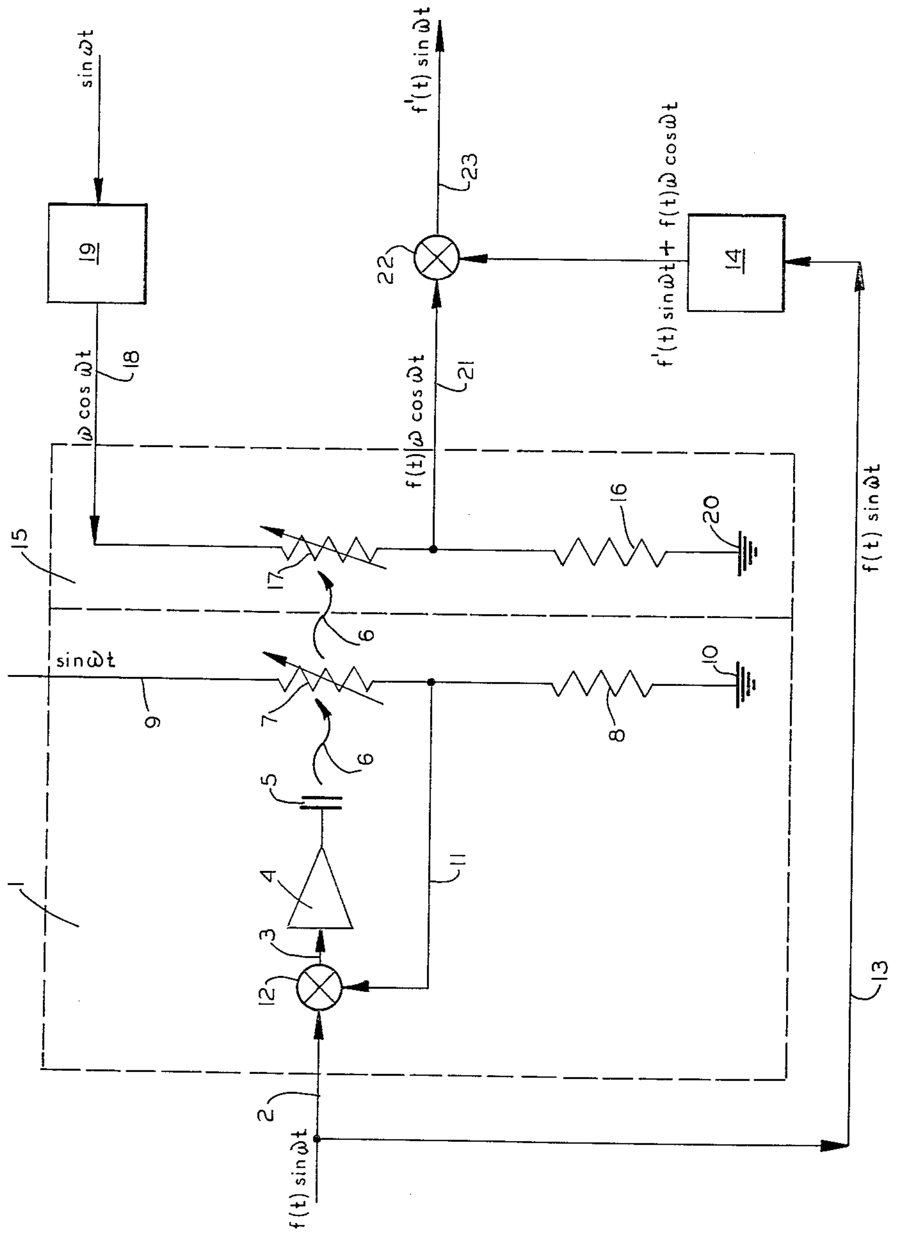

This invention relates generally to electronic computer circuits and more particularly to a computer circuit for generating a signal proportional to the rate of change of an input variable.

It is an object of this invention to provide a simple rate generation circuit having no moving parts and resulting in increased reliability over present equivalent circuits.

It is a further object of this invention to provide a rate generation circuit of substantially reduced size and weight and having extremely small power requirements relative to equivalent circuits heretofore employed.

The foregoing and other objects and advantages of this invention will become apparent to those skilled in the art upon an understanding of the following description considered in connection with the accompanying drawing and appended claims.

FIG. 1 is a schematic diagram illustrating a preferred embodiment of the present invention.

The illustrated circuit utilizes properties displayed by certain electroluminescent and photoconductive materials by combining elements comprised of these materials in a simple follower servo loop optically coupled with a light responsive output circuit to generate a signal which is proportional to the rate of change of an input variable supplied as a command voltage to the follower servo loop. Ordinarily network differentiation is limited to direct current circuits because of the fact that differentiating networks also operate on an A.-C. carrier which produces unwanted terms in the differentiated output. The usual expedient for avoiding this problem is to demodulate the input signal, differentiate and then modulate. The problem of carrier differentiation in the present invention is obviated by the very nature of the optically coupled electroluminescent-photoconductive combination. Electroluminescent-photoconductive combinations of the type contemplated herein are more fully described in copending United States application Serial No. 18,028, filed March 28, 1960, for Solid State Computer.

A specific embodiment of the rate generation circuit is illustrated schematically in FIG. 1 wherein the input command voltage $[f(t)]$ which is to be differentiated, superimposed upon its A.-C. carrier $[\sin\omega t]$, is provided as the input to a follower servo loop, referred to generally as 1. The servo loop 1 comprises an input channel 2 to which the command voltage $[f(t)\sin\omega t]$ is supplied. A signal comprising the sum of this command voltage and a variable feedback voltage described below is supplied by means of conduit 3 as the input to a high-gain voltage amplifier 4. The amplifier 4 provides the potential necessary to energize an electroluminescent element 5, referred to herein for simplicity as a lamp. The voltage impressed across electroluminescent lamp 5 causes it to emit light represented by the wavy line 6. This light falls upon an element 7 positioned adjacent to electroluminescent lamp 5 and formed of photoconductive material, referred to herein as a photoconductive resistor and represented as a variable resistor in the drawing. The electroluminescent lamp 5 and photoconductive resistor 7 are optically coupled with one another so that no external influence can intercept or interrupt the light 6 emitted from the electroluminescent lamp 5.

Photoconductive resistor 7 is part of a feedback control circuit including voltage dividing means which comprises the photoconductive resistor 7 and a fixed resistor 8 connected in series across the A.-C. carrier voltage $[\sin\omega t]$ at 9 and ground at 10. The voltage dividing means is center-tapped by a feedback voltage connection 11 which supplies a variable feedback voltage to summing means 12. Various types of summing means will be apparent to those skilled in this art for comparing the feedback voltage in connection 11 with the input command voltage to produce an error signal which is the difference between the two voltages. The resultant error signal is supplied to amplifier 4 by conduit 3 and controls the performance of the servo loop 1 so that the intensity of light 6 emitted from electroluminescent lamp 5 is stabilized at a value exactly corresponding to the input command voltage exclusive of the A.-C. carrier or $f(t)$.

The feedback voltage appearing in connection 11 is proportional to the product of the effect of the light 6 emitted from electroluminescent lamp 5 and the excitation voltage $[\sin\omega t]$ applied at 9. Since at equilibrium to satisfy the equation of the closed servo loop the feedback voltage must equal the input command voltage $[f(t)\sin\omega t]$, the effect of the light 6 times the excitation voltage $[\sin\omega t]$ must equal $f(t)\sin\omega t$. Therefore, the effect of the light equals only $f(t)$, the A.-C carrier canceling out. The servo loop 1 and the foregoing characteristic is more fully described in copending United States application Serial No. 18,028 and forms a part of this invention only in its combination with the output circuits hereinafter described.

The command voltage in addition to being supplied to the servo loop 1 also is supplied through channel 13 to a passive A.-C. rate circuit 14 which differentiates its input $[f(t)\sin\omega t]$ and produces an output signal proportional to $f'(t)\sin\omega t+f(t)\omega\cos\omega t$. It will be apparent that the first term of this output, to wit, $f'(t)\sin\omega t$ is the desired ultimate rate quantity, and that the second term $[f(t)\omega\cos\omega t]$ is extraneous.

To eliminate the extraneous term (i.e. the effect of the A.-C. carrier) the servo loop 1 is optically coupled with a multiplying output circuit 15 comprising a voltage divider having in series a fixed resistor 16 and a photoconductive resistor 17 also optically associated with the light 6 produced from electroluminescent lamp 5 of the controlling servo loop 1. Excitation furnished to the voltage divider at 18 is a voltage proportional to the differentiated A.-C. carrier voltage or $\omega\cos\omega t$. This excitation voltage is derived by supplying a second passive A.-C. rate circuit 19 with only the A.-C. carrier voltage $[\sin\omega t]$ which it differentiates to produce an output proportional to $\omega\cos\omega t$. The voltage divider is grounded at 20 and a center tap 21 furnishes an output voltage which is the product of the effect of the light 6 $[f(t)]$ and the voltage divider exictation $[\omega\cos\omega t]$ or $f(t)\omega\cos\omega t$.

The latter signal and the output of passive A.-C. rate circuit 14 are subtracted by summing means 22 to derive the ultimate rate output equal to $f'(t)\sin\omega t$ appearing in output conduit 23. It will be apparent to those familiar with this art that the foregoing rate generation circuit is more effective than carrier suppression rate circuits since it is not sensitive to the carrier frequency and is much more economical of size, weight and complexity than tachometric means of rate generation. The foregoing detailed description has been given for clearness of understanding only and no unnecessary limitations should be understood therefrom, for certain modifications of the circuit of the present invention will be obvious to those skilled in the art.

We claim:

1. A computer circuit for generating a voltage proportional to the rate of change of a variable voltage modulating a carrier voltage including means for producing light varying in intensity in direct relation to said variable voltage; voltage dividing means having a photoconductive element optically associated uninterruptibly with said light and responsive to the intensity of only said light; a first passive A.-C. rate circuit supplying to said voltage dividing means a voltage proportional to the rate of change of said carrier voltage only; summing circuit means; a second passive A.-C. rate circuit supplying to said summing circuit means a voltage proportional to the rate of change of said modulated carrier voltage; and a center-tap connection on said voltage dividing means supplying to said summing circuit means a voltage proportional to the product of said variable voltage and said rate of change of said carrier voltage whereby the output of said summing circuit means is proportional to the rate of change of said variable voltage.

2. A computer circuit for generating a voltage proportional to the rate of change of a variable voltage modulating a carrier voltage including an electroluminescent-photoconductive servo loop emitting light varying in intensity in direct relation to said variable voltage; voltage dividing means having a photoconductive element optically coupled uninterruptibly to said servo loop and responsive to the intensity of only said light; a first passive A.-C. rate circuit supplying to said voltage dividing means a voltage proportional to the rate of change of said carrier voltage only; summing circuit means; a second passive A.-C. rate circuit supplying to said summing circuit means a voltage proportional to the rate of change of said modulated carrier voltage; and a center-tap connection on said voltage dividing means supplying to said summing circuit means a voltage proportional to the product of said variable voltage and said rate of change of said carrier voltage whereby the output of said summing circuit means is proportional to the rate of change of said variable voltage.

3. A computer circuit for generating a voltage proportional to the rate of change of a variable voltage modulating a carrier voltage including an electroluminescent-photoconductive servo loop comprising a voltage amplifier, means for supplying the modulated carrier voltage to said amplifier, electroluminescent means energized by the output of said amplifier and emitting light varying in intensity in relation to said variable voltage, and feedback control means supplying an error signal to said amplifier including a first voltage dividing means having a photoconductive element optically coupled uninterruptibly to said electroluminescent means and responsive to the intensity of only said light, a source of carrier voltage only applied across said first voltage dividing means for developing a feedback voltage varying in relation to the conductivity of said photoconductive element and summing means for comparing said feedback voltage with said modulated carrier voltage and for producing said error signal; a second voltage dividing means having a photoconductive element optically associated uninterruptibly with said light and responsive to the intensity of only said light; a first passive A.-C. rate circuit supplying to said second voltage dividing means a voltage proportional to the rate of change of said carrier voltage only; a summing circuit; a second passive A.-C. rate circuit supplying to said summing circuit a voltage proportional to the rate of change of said modulated carrier voltage; and a center-tap connection on said second voltage dividing means supplying to said summing circuit a voltage proportional to the product of said variable voltage and said rate of change of said carrier voltage whereby the output of said summing circuit is proportional to the rate of change of said variable voltage.

No references cited.